G. W. COLLIN.
REGULATING VALVE.
APPLICATION FILED MAY 13, 1909.

949,294.

Patented Feb. 15, 1910.
3 SHEETS—SHEET 1.

WITNESSES
Elbrid O. Hull
Ruth Raymond

INVENTOR
George W. Collin
BY
Chamberlain & Newman
ATTORNEYS

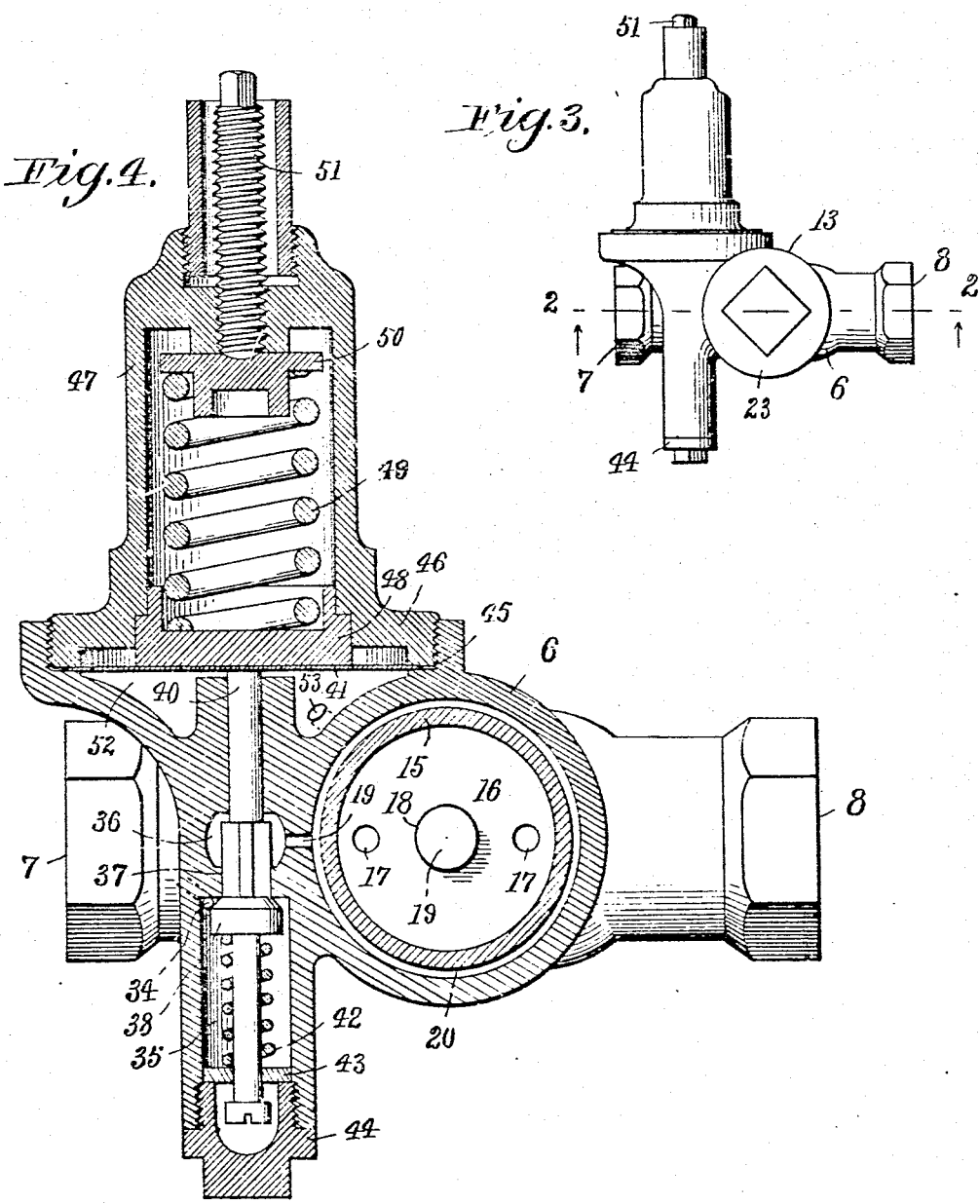

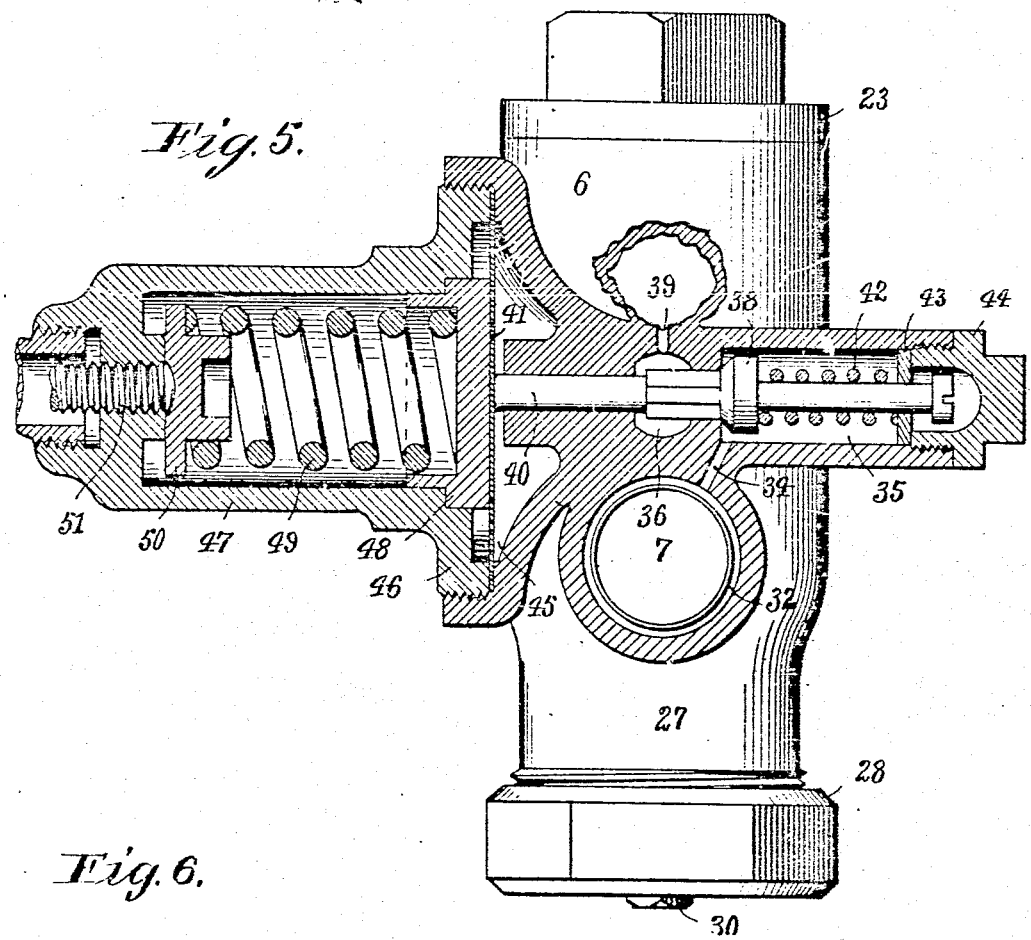

UNITED STATES PATENT OFFICE.

GEORGE W. COLLIN, OF BRIDGEPORT, CONNECTICUT.

REGULATING-VALVE.

949,294.

Specification of Letters Patent. Patented Feb. 15, 1910.

Application filed May 13, 1909. Serial No. 495,633.

*To all whom it may concern:*

Be it known that I, GEORGE W. COLLIN, a citizen of the United States, and resident of Bridgeport, in the county of Fairfield and State of Connecticut, have invented certain new and useful Improvements in Regulating-Valves, of which the following is a specification.

My invention relates to improvements in valves, and especially to valves employed for reducing and regulating steam, water, air or gas from a higher pressure to any desired lower service pressure.

The purpose of the invention is to simplify the construction, improve the efficiency and greatly increase the accessibility of valves of this class; to so design the device that the bodies may be made of cast iron, steel, or bronze of ample tensile strength but unfitted for wearing surfaces, and the wearing and contacting parts made of high grade bronze, nickel or other metal, thereby obtaining valves of the highest efficiency and continuity of service at a minimum cost of manufacture.

Figure 1:
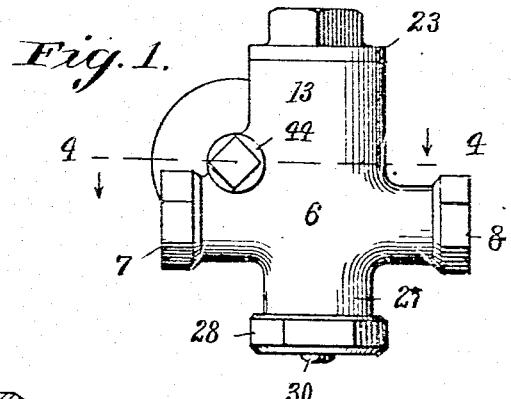
Figure 2:
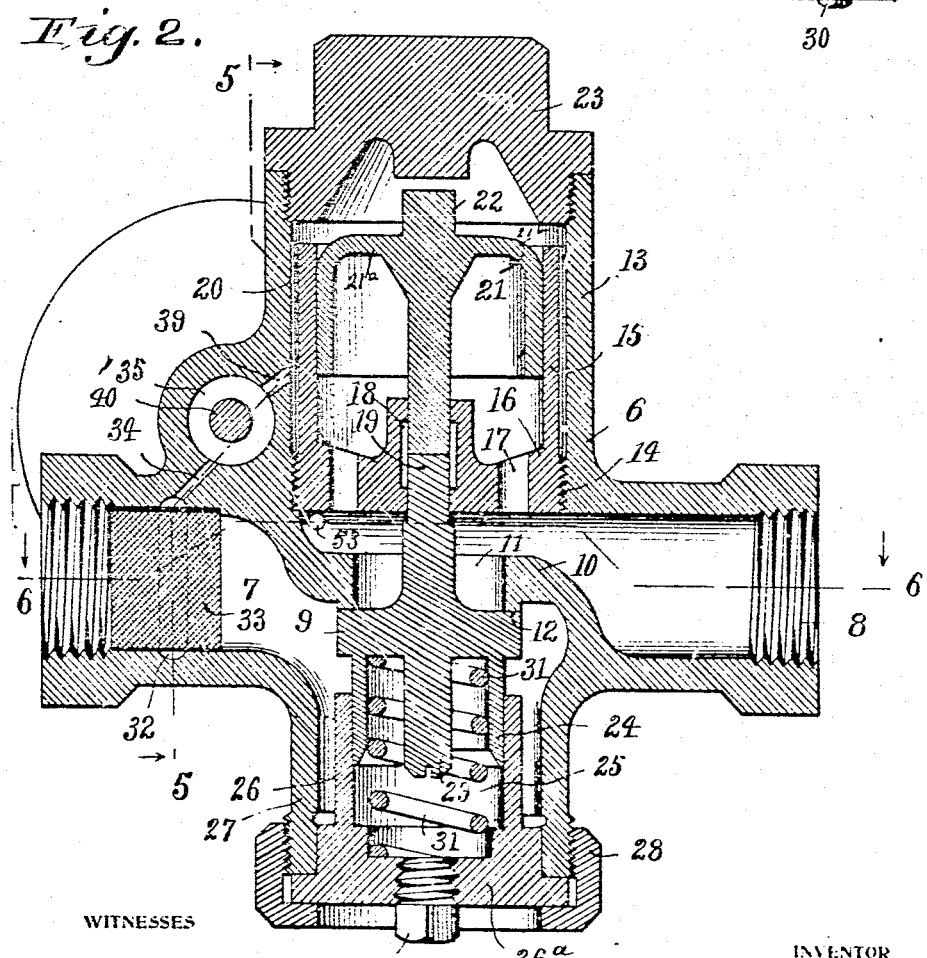

Upon the accompanying three sheets of drawings forming a part of this specification similar characters of reference denote like or corresponding parts throughout the several figures and of which, Figure 1, shows a side elevation on a reduced scale of one of my improved valves. Fig. 2, is an enlarged central vertical section through the valve shown in Fig. 1, and taken on line 2—2 of Fig. 3. Fig. 3, is a plan view of the same valve but upon a smaller scale, as shown in Fig. 1. Fig. 4, shows a horizontal sectional plan view of the valve taken on line 4—4 of Fig. 1. Fig. 5, shows a sectional elevation of the valve as seen from line 5—5 of Fig. 2, and illustrating the steam ports, and Fig. 6, shows a horizontal sectional plan view of the valve taken on line 6—6 of Fig. 2.

The valve is constructed to be operated by the steam pressure in low pressure side of the valve, through the medium of an auxiliary valve, a diaphragm, regulating spring and connecting parts. The diaphragm chamber is connected with low pressure side of valve for the purpose of permitting the steam pressure therein to move the diaphragm to operate the auxiliary valve with which it contacts, and which in turn serves to control the steam pressure for moving a piston to operate the main valve between the inlet and outlet. The main valve and piston as well as the specially constructed linings and guideways therefore are formed of a high grade metal specially designed for such service.

In detail 6 represents the main body which may be provided with the usual threaded inlet 7 and outlet 8 whereby it may be connected with steam pipes for service. The outlet is located in line with and directly opposite the inlet while the main valve 9 is arranged to operate vertically and at a right angle to the line of inlet and outlet. A wall 10 divides the two sides of the valve body and is provided with a port 11, upon the underside of which is formed a seat 12 for the before mentioned valve 9 to close against.

A comparatively large cylindrical chamber 13 is formed upon the top side of the body as seen in Figs. 1 and 2. and in line with the main valve port. The lower end portion of this chamber 13 is slightly contracted and as originally formed opens into the outlet side 8 of the body. Said reduced portion however is threaded as at 14 to receive the lower end of a cylindrical liner 15, the bottom portion 16 of which is solid except for the steam ports 17 and a central guide hole 18 through which latter the upwardly disposed stem 19 of the valve 9 extends. The vertical walls of this liner are of an equal thickness upon all sides and are spaced from the walls of the chamber as indicated by 20, Fig. 2, so as to allow the steam within the chamber to freely circulate all around the liner for the purpose of heating and expanding the same equally on all sides. The inner surface of said cylinder is smoothly finished to receive a piston 21 which is mounted in the upper portion thereof and provided with a depending stem that is guided in the guide hole 18 and rests upon the top end of the valve stem 19 when in the position shown in Fig. 2 to insure a free movement of both the piston and valve.

The piston comprises an end head 21ᵃ having an integral cylindrical flange portion that closely fits the said liner 15. The peripheral top portion of this piston is cut away as at 21ᵇ to free that part from the inner walls of the liner and prevent sticking, should it by reason of the presence of the stock of the head expand more than the remaining portion of the piston. The piston is provided upon its top side with a central lug 22 that serves to engage the underside of the plug cap 23 threadably attached to the inside of the upper end portion of the cylindrical chamber 13 to close the same. The valve 9 is provided with a depending guide piston 24 which is fitted to reciprocate back and forth in a guide cylinder 25 formed on annular extension 26 of the hub 26ª. The said piston 24 fits the guide 26 with just enough looseness to allow steam to pass between the two seated in the end of the cylindrical branch 27 of the main body and held in place by a union nut 28 attached to the threaded peripheral edge of said branch. This liner as well as liner 15 is supported from one end thus both the piston and guide piston operate in and adjacent to that part of the liner distant from the said engaged part with the result that any unequal expansion of the liner will not affect the contour of the section in which the pistons act, thus enabling me to avoid the use of packing rings. The valve 9 is provided with a central depending stem 29 which is slotted to receive the end of a screw driver not shown, when inserted through the central hole of the hub 26 for grinding the valve to its seat, said opening being normally closed by the screw 30 as shown in Fig. 2. A spiral spring 31 may be seated intermediate of the underside of the valve 9 and the hub 26ª to normally hold the valve against its seat if the same should be found necessary. When not in use and by the removal of the nut 28, hub and spring the valve 9 can readily be removed for inspection, cleaning or repairs should occasion require without disturbing any of the other parts, while on the other hand should it be desirable to get into the top side of the valve the same can be accomplished equally as well by the removal of the cap 23, which readily permits the piston to be taken out and the valve inspected.

Steam may be turned on the valve when cap is removed and before the piston is in place in its chamber and if desired before the diaphragm and spring case are in place or these parts may be removed at any time for inspection as follows: With the valve under steam pressure and the main valve "leaking steam" it will be plainly seen passing up through openings 17 in the cylinder 15 and out of passage 53 into the diaphragm chamber. If the auxiliary valve "leaks" steam, it will be seen rising from passage 39 between the cylinder of the valve body and the liner 15. This affords instant detection of which valve needs cleaning or regrinding. The action of the auxiliary valve may be tested by pushing against its stem 40 forcing the valve from its seat and letting it close again, ascertaining if the movement is free and parts close perfectly. Then putting the piston 21 in its chamber and plug 23 in position the auxiliary valve can again be opened and let close by direct manipulation of its stem, observing the operation of the piston and main valve. The advantages of these unique and novel features in an apparatus of this class for the manufacturer's inspector, in testing finished valves, or for examination when the valve is in service, is of great practical value. The inlet side 7 of the valve body 6 is provided with an annular recess 32 which is covered by an annular strainer 33 that is open at both ends being designed to permit the steam to pass directly in and through the inlet to the main valve but to strain the same when passing to either the auxiliary valve, or piston chambers. 34 represents a steam port leading from this annular recess 32 to the auxiliary valve chamber 35 which in turn is connected with an intermediate chamber 36 through the auxiliary valve port 37 but which is normally closed by the auxiliary valve 38. The intermediate chamber 36 is connected by a further port 39 with the piston chamber and space 20 around the liner 15, which port together with the passages 34, 36 and 37 serve to direct the steam pressure to the top side of the piston to operate the same and the valve, at such times as when the steam pressure on service side of valve falls below the required amount and the auxiliary valve is opened as a result thereof. The stem 40 of the auxiliary valve 38 extends through the port 37, chamber 36 and on through guide in body to engage the diaphragm 41. This valve is normally kept seated in a way to close this port 37 by the action of a spring 42 seated within the pocket of the body and arranged intermediate of the said valve and a washer 43 held in place by a plug 44 which also serves to close the pocket. The outer end of the auxiliary valve stem abuts against the inside of the diaphragm 40 that is seated within an annular chamber 45 of the body and secured thereagainst by the enlarged lower end portion 46 of a spring case 47 screwed against it. On the opposite side of the diaphragm is seated a hub 48 against which one end of a regulating spring 49 abuts while the other end is seated against a hub 50 normally resting against the top end of the spring case but made adjustable with respect thereto by means of a screw 51, said construction being desirable for the adjustment of the spring to regulate the tension upon the diaphragm to set the same to cause it to operate at a predetermined pressure. The diaphragm chamber 52 is connected with the outlet or service steam side of the valve body through a drilled hole 53 in the body and whereby the steam pressure in that chamber stands the same as that in the service system.

The operation of my improved valve is substantially as follows: Assuming the valve to be connected up with steam pipes as in service, and the steam turned in from a boiler, with the valve closed, it would first be necessary to manually operate the valve which is accomplished by turning the screw 51 which through the medium of the regulating spring 19 the hub and diaphragm pushes the auxiliary valve 38 from its seat, admitting steam from the inlet through the strainer and ports 34 and 39 to the space outside the cylindrical liner to form a pressure above the piston 21 that serves to operate the same and open the main valve. The main valve cannot open violently as the steam in the cylinder 25 serves as a cushion and has to be forced out before the valve can move down. After being opened and when a sufficient amount of steam has passed through to build up the pressure in the service side and diaphragm chamber 52, through the hole 53, the auxiliary valve closes cutting off the steam from above the piston thus causing the main valve to close quickly though noiselessly.

Having thus described my invention what I claim and desire to secure by Letters Patent is:—

1. A regulating valve of the class described, the same comprising a casing having an inlet and an outlet chamber with a ported division wall therebetween and a cylindrical chamber extended out on one side, a cylindrical liner within and spaced from the side walls of the cylindrical chamber except its lower portion which is threaded for engagement with the cylinder and having a central guide hole in its bottom, a valve within the casing to close the port of the wall and having a guide stem passing through the said hole, a piston slidably mounted in the liner and adapted to engage the stem of the valve to operate the same.

2. A regulating valve of the class described, the same comprising a casing having an inlet and an outlet chamber with a ported division wall therebetween and a cylindrical chamber extended out on one side, a cylindrical liner within and spaced from the walls of the cylindrical chamber except its lower portion which is threaded for engagement with the cylinder and a central guide hole in the bottom of the cylinder, a valve within the casing having a stem to engage the hole and a depending annular guide piston, and an inwardly disposed annular extension forming a cylinder within the casing to receive the guide piston of the valve to form a cushion for the same.

3. A regulating valve of the class described, the same comprising a casing having an inlet and an outlet chamber with a ported division wall therebetween and a cylindrical piston chamber extended out on one side, a cylindrical liner within and spaced from the side walls of the piston chamber but attached to the lower part thereof, a valve within the casing and having a depending annular guide piston, a hub bearing an inwardly disposed annular extension forming a cylinder to receive the guide piston under the valve, a nut to engage the hub and hold it in place within the casing, a piston to operate the valve, an auxiliary valve to control the passage of initial steam pressure to operate the piston, and a diaphragm to move the auxiliary valve.

4. A regulating valve of the class described, the same comprising a casing having an inlet and an outlet and a cylindrical chamber extended out on one side, a cylindrical liner within and spaced from the side walls of the cylindrical chamber but attached to the lower part of the chamber, a valve within the casing and having a depending guide piston, a hub having an inwardly disposed annular extension forming a cylinder to receive the guide piston under the valve, a nut to engage the hub and hold it in place within the casing, a spring within the cylinder to hold the valve against its seat, a screw plug through the hub to form an opening to get at the valve to grind the same, a piston to operate the valve, an auxiliary valve to control the passage of initial steam pressure to operate the piston, and a diaphragm to move the auxiliary valve.

5. A regulating valve of the class described, the same comprising a casing having an inlet and an outlet and a cylindrical piston chamber extended out on one side, a cylindrical liner within and spaced from the side walls of the chamber but attached to the lower part thereof, a valve within the casing and having a downwardly disposed guide piston, a hub having an inwardly disposed annular extension forming a cylinder to receive said guide piston under the valve, a nut to engage the hub and hold it in place within the casing, an annular groove within the inlet chamber, an annular strainer within the chamber covering the groove, a port from the groove to an auxiliary valve chamber, an auxiliary valve in said chamber, a port leading from said valve to the piston chamber, a diaphragm in contact with the auxiliary valve stem, a regulating spring setting against the action of reduced steam service pressure.

6. A regulating valve of the class described, the same comprising a casing having an inlet and an outlet chamber with a ported division wall therebetween and a cylindrical chamber, a cylindrical liner within the chamber having its upper portion spaced from the walls of the chamber and its lower portion fixed thereto and having a central guide hole in its bottom, a valve within the casing having a stem to enter the hole, a guide cylinder formed in line with the valve to receive a fitted portion of the valve and form a cushion therefor, a piston slidably mounted within the liner and having a depending stem to abut against that of the valve.

7. A regulating valve of the class described, the same comprising a casing having an inlet and an outlet chamber with a ported division wall therebetween and a cylindrical chamber extended out on one side, a separable cylindrical liner within and attached to the walls of the lower part of the cylindrical chamber but spaced from the remaining portions of said walls, a valve within the casing, a cushion cylinder for the valve, a disconnected piston slidably mounted within the liner and adapted to operate the valve, an auxiliary valve to control the passage of steam to the piston chamber, a diaphragm to operate the auxiliary valve, a regulating spring acting on the outer surface of the diaphragm against the reduced steam service pressure.

8. A regulating valve of the class described, the same comprising a casing having an inlet and an outlet chamber and a cylindrical piston chamber, a cylindrical liner secured within and to the lower portion of the piston chamber but spaced from the side walls of the upper part thereof, a flanged piston mounted within the liner and having its peripheral top edge portion cut away opposite to the head, a valve disconnected from but adapted to be operated by the piston, a cushion cylinder for the valve, ports leading from the inlet to the piston chamber, an auxiliary valve for controlling the passage of initial steam to the chamber above the piston, and a diaphragm for operating the auxiliary valve.

Signed at Bridgeport, in the county of Fairfield, and State of Connecticut, this 11th day of May A. D. 1909.

GEORGE W. COLLIN.

Witnesses:
RUTH RAYMOND,
C. M. NEWMAN.